W. JÖRGENSEN.
GAGE.
APPLICATION FILED MAY 10, 1909.
948,141.
Patented Feb. 1, 1910.
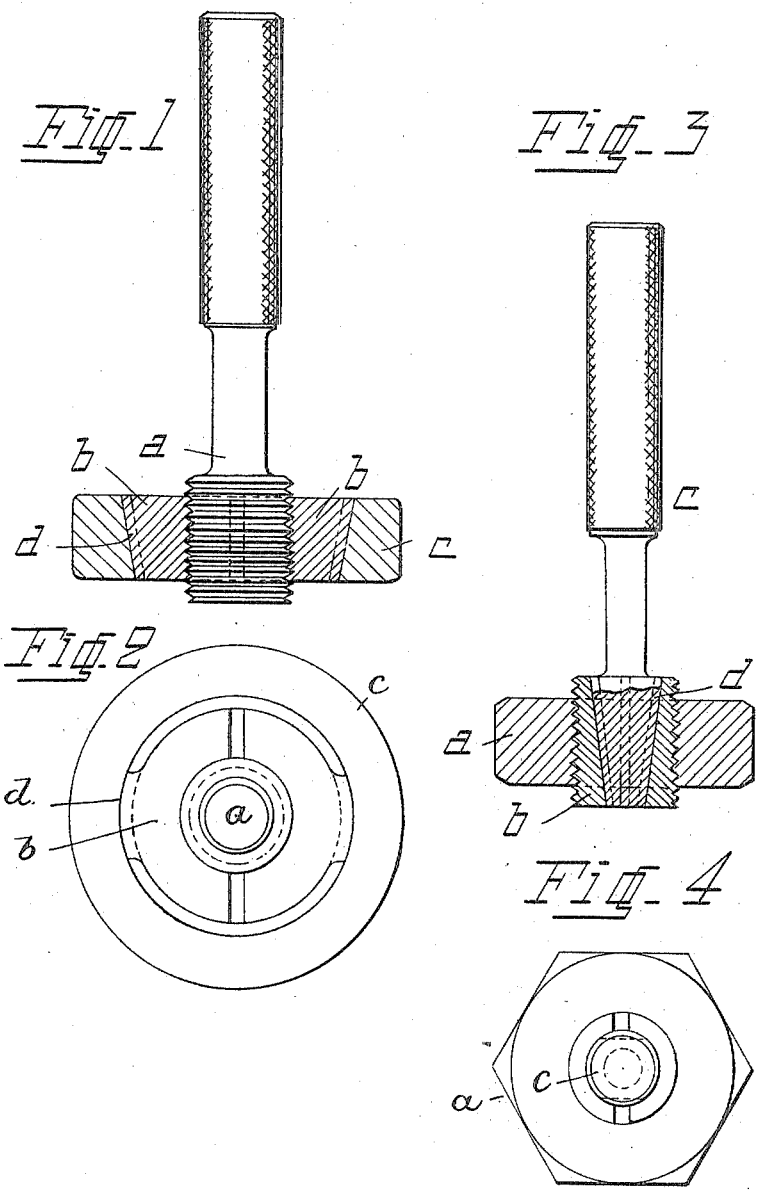

UNITED STATES PATENT OFFICE.

WALTER JÖRGENSEN, OF STOCKHOLM, SWEDEN, ASSIGNOR, TO GUSTAF FRISELL, OF STOCKHOLM, SWEDEN.

GAGE.

948,141.      Specification of Letters Patent.      Patented Feb. 1, 1910.

Application filed May 10, 1909. Serial No. 495,183.

*To all whom it may concern:*

Be it known that I, WALTER JÖRGENSEN, engineer, a subject of the Emperor of Russia, and residing at Stockholm, Sweden, have invented certain new and useful Improvements in Gages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a gage of simple and efficient construction and operation for determining the external or internal measurements of objects, as, for example, bolts and nuts.

To this end, the invention, as generally stated, comprises two complementary gage members free and unfettered with respect to each other having correspondingly tapering co-acting surfaces, one of said members consisting of a plurality of parts or sections adapted to be loosely interposed between the other member and the object to be measured in such a manner that the dimensions of the object will permit the coöperating tapering surfaces of the two members without the assistance of screws or like adjusting devices to assume and occupy determinate relative positions, and thus indicate to the observer the exactness or inexactness of the dimensions of such object.

The invention also comprises novel features of construction which will be hereinafter particularly described and claimed.

In the annexed drawings—Figure 1 is a vertical section of a form of embodiment of my invention designed for external measurement of an object, such as a threaded shank or bolt. Fig. 2 is a plan thereof. Fig. 3 is a similar section of another form of embodiment as designed for the internal measurement of an object, such as a nut. Fig. 4 is a plan of Fig. 3.

Referring to Figs. 1 and 2 of the drawings, *a* represents a bolt, and *b*, *c*, the respective members of my improved gage device for determining the diameter of the threaded portion of the bolt, which members are free and unfettered, that is to say, they are devoid of connecting devices and hence one may be loosely applied to or removed from the other. In the present instance the member *b* comprises a segmental plug in the form of a truncated cone with a centrally-threaded orifice for the reception of the threaded portion of the bolt. The plug consists of two or more sections, which, being unconnected or loosely separated, are relatively movable toward or from each other as the diameter of the bolt may dictate. The member *c* comprises a body having therein a tapering orifice corresponding with the conicality of the plug (as indicated at *d*). The diameter of this orifice is such that if the bolt be of a standard or prescribed size, the plug, when the bolt is applied thereto, will be of corresponding diameter, and if such plug be then inserted in the orifice, the plug will snugly enter the same and lie flush with the top of the member *c*. If, on the other hand, the diameter of the bolt be above or below the proper size, the diameter of the plug will be accordingly increased or diminished thereby, and in consequence, the plug when introduced to the orifice will extend above or sink below the top of the member *c*, as the case may be.

Inasmuch as the taper of the plug and its complemental member can be made very slight, it is obvious that any inaccuracy, however minute, in the dimensions of the object being gaged can be readily ascertained. It is to be noted that the plug (with the bolt applied thereto) when loosely inserted in the base member assumes its position therein by gravity, thus minimizing the wear which would result if screws or other tightening devices were employed.

In Figs. 3 and 4 is shown a form of the device for determining the inner diameter of a nut, as *a*. In this form of the device, the sectional plug *b* is externally screw-threaded, and provided with a smooth centrally tapering orifice; and the complemental member *c* has a correspondingly tapering portion for insertion in the orifice, (as indicated at *d*). To use the device just described, the sectional plug is first screwed into the nut, and the diameter of the tapering orifice is thereby accordingly adjusted, whereupon the member *c* is loosely introduced to the orifice, as illustrated. The depth to which the member *c* sinks within the orifice, indicates whether the diameter of the hole in the nut is exact, too great, or too small.

In using my improved gage the reading off can be done in various ways, generally and preferably by ocular observation of the relative positions of its two constituent members.

It is to be understood, of course, that the device is susceptible of modification without departure from the characteristic feature of the invention which resides in the employment of two complementary gage members free and unfettered with respect to each other having correspondingly tapering surfaces, one of said members comprising a plurality of parts or sections adapted to be loosely interposed between the other member and the object to be measured, as hereinbefore pointed out.

While the device is adapted to the gaging of internal and external dimensions of objects generally, yet it is especially useful for measuring screw threads or screw-threaded objects.

I claim—

1. A gage of the character described comprising two complementary gage members free and unfettered with respect to each other having correspondingly tapering surfaces for inter-engagement, one of said members consisting of a plurality of relatively movable parts or sections adapted to be loosely interposed between the other member and the object to be measured, whereby the two members, unassisted, assume and occupy determinate gaging positions relatively to each other.

2. A gage of the character described comprising a sectional member having a smooth tapering surface and a screw-threaded surface, and a complementary member having a corresponding smooth tapering surface, the said members being free and unfettered with respect to each other, and the sectional member being adapted to be loosely interposed between the other member and the object to be measured, whereby the said members, unassisted, assume and occupy determinate gaging positions relatively to each other.

3. A gage of the character described comprising a sectional plug having a smooth tapering surface, and a complemental member therefor having a correspondingly tapering surface, the said plug and member being free and unfettered with respect to each other, and the said plug being adapted to be loosely inserted between the said member and the object to be measured, whereby the said plug and member, unassisted, assume and occupy gaging positions relatively to each other.

4. A gage of the character described comprising a hollow tapering two-part plug, and a hollow body provided with a correspondingly tapering orifice for the reception of the said plug, the said plug and body being free and unfettered with respect to each other, and the said plug being adapted to be loosely inserted between the said member and the object to be measured, whereby the said plug and body, unassisted, assume and occupy determinate gaging positions relatively to each other.

In testimony, that I claim the foregoing as my invention, I have signed my name in presence of two subscribing witnesses.

WALTER JÖRGENSEN.

Witnesses:
 HARRY ALBIHN,
 FOLKE R. SHORE.